United States Patent
Verbeeck et al.

(10) Patent No.: US 11,540,529 B2
(45) Date of Patent: Jan. 3, 2023

(54) SPREADABLE FAT-CONTAINING FOOD PRODUCTS

(71) Applicant: FUJI OIL EUROPE, Ghent (BE)

(72) Inventors: Sabrina Verbeeck, Kieldrecht (BE); Bernard Cleenewerck, Knokke-Heist (BE); Bart Vanderlinden, Deinze (BE)

(73) Assignee: FUJI OIL EUROPE, Ghent (BE)

( * ) Notice: Subject to any disclaimer, the term of this patent is extended or adjusted under 35 U.S.C. 154(b) by 326 days.

(21) Appl. No.: 16/651,662

(22) PCT Filed: Sep. 28, 2018

(86) PCT No.: PCT/EP2018/076529
§ 371 (c)(1),
(2) Date: Mar. 27, 2020

(87) PCT Pub. No.: WO2019/063824
PCT Pub. Date: Apr. 4, 2019

(65) Prior Publication Data
US 2020/0305456 A1 Oct. 1, 2020

(30) Foreign Application Priority Data

Sep. 28, 2017 (BE) .................. 2017/5691

(51) Int. Cl.
| | | |
|---|---|---|
| *A23D 7/005* | (2006.01) | |
| *A23D 7/01* | (2006.01) | |
| *A23D 7/05* | (2006.01) | |
| *A23G 1/36* | (2006.01) | |
| *A23G 1/56* | (2006.01) | |

(52) U.S. Cl.
CPC ........... *A23D 7/0056* (2013.01); *A23D 7/013* (2013.01); *A23D 7/05* (2013.01); *A23G 1/36* (2013.01); *A23G 1/56* (2013.01); *A23V 2002/00* (2013.01)

(58) Field of Classification Search
CPC ...... A23D 7/0056; A23D 7/013; A23D 7/011; A23D 7/01; A23D 7/0053; A23D 7/05; A23D 7/04; A23D 7/02; A23G 1/36; A23G 1/56
See application file for complete search history.

(56) References Cited

FOREIGN PATENT DOCUMENTS

| | | | | |
|---|---|---|---|---|
| EP | 2241189 A1 | * | 10/2010 | ............. A23D 7/001 |
| EP | 2443935 B1 | * | 5/2013 | ............. A23D 7/003 |
| WO | 2016162529 A1 | | 10/2016 | |
| WO | 2017055102 A1 | | 4/2017 | |

OTHER PUBLICATIONS

International Search Report dated Dec. 12, 2018, issued in corresponding International Application No. PCT/EP2018/076529, filed Sep. 28, 2018, 4 pages.
Written Opinion of the International Searching Authority dated Dec. 12, 2018, issued in corresponding International Application No. PCT/EP2018/076529, filed Sep. 28, 2018, 6 pages.
Belgian Search Report and Written Opinion completed Jun. 6, 2018, issued in corresponding Belgian Application No. BE2017/5691, filed Sep. 28, 2017, 9 pages.
Danthine, S., et al.: "Crystallization behaviour of binary fat blends containing shea stearin as hard fat", European Journal of Lipid Science and Technology, 117(11), Nov. 2015, pp. 1687-1699, XP055388131.
Garcia-Macias, P. et al., "Effect of TAG composition on performance of low saturate shortenings in puff pastry", European Journal of Lipid Science and Technology, 114(7), Jul. 2012, pp. 741-747, XP055388141.

* cited by examiner

*Primary Examiner* — Changqing Li
(74) *Attorney, Agent, or Firm* — Christensen O'Connor Johnson Kindness PLLC

(57) ABSTRACT

Spreadable fat-containing food products, such as confectionery spreads, with improved structural stability and good organoleptic properties, and methods of their production are disclosed. The products include glyceride compositions which are characterized by having a healthy fatty acid profile, such as a reduced level of saturated fatty acids (SAFA).

21 Claims, No Drawings

SPREADABLE FAT-CONTAINING FOOD PRODUCTS

FIELD OF INVENTION

The present invention relates to confectionery spreads, in particular spreadable fat-containing food products with improved structural stability and good organoleptic properties comprising glyceride compositions which are characterized by having a healthy fatty acid profile, i.e. a reduced level of saturated fatty acids (SAFA). The present invention further relates to a method for producing said confectionery spreads, in particular spreadable fat-containing food products.

BACKGROUND OF THE INVENTION

Food Industries produces a large number of spreadable products, such as marmalade, spreadable cheese, margarine, chocolate spreads, etc. These products are characterized by a soft texture, which allows them to be spread on a surface of a food product such as on a slice of bread.

Producers of margarines have made already quite some efforts to improve and optimize the nutritional profile of their products. Margarines are emulsions, in particular water-in-oil (W/O) emulsions, that contain a considerable amount of water and that are produced according to specific emulsifying processes, which allow the producers to incorporate very high amounts of liquid oils, combined with a hard fat, a so called hardstock. The final product is stored in the fridge and has a soft texture which makes the product easily spreadable.

Another important category of spreadable products, are spreadable confectionery products, like the so-called chocolate spreads or confectionery spreads. These products often contain nut paste. These products contain sugar or a sugar replacer, other dry ingredients for instance cocoa powder and/or milk powder and/or whey powder, and fat, mostly vegetable fat and mostly an emulsifier, such as lecithin. In the case that the spread also contains nut paste, like hazelnut, almond, etc., the nuts contribute to both of the dry ingredients (i.e. the fat-free dry matter part of the nuts) and the fat phase by the presence of nut oil, which is a liquid oil.

In this product category, a number of food producers have tried to improve the healthy image or nutritional properties of their products, although with varying and limited success.

Some products appeared on the market with a non-palm label. However, the fatty acid profile of such products proves that there is still room for important nutritional improvement. The SAFA level of these products is still too high, and also their level of atherogenic fatty acids is quite considerable.

WO 2010/149323 relates to soft cocoa butter compositions and their use in food, beverage and cosmetic applications. The advantage of using cocoa butter and cocoa butter fractions is said to be their superior taste and creamy mouth-feel, compared to palm oil for instance. Pure cocoa butter is also perceived by the consumer for its healthier and higher quality. A disadvantage of using oil blends of cocoa butter with other oils and fats versus soft cocoa butter fractions, is said to be the tendency to separate in the food product over time, meaning a reduced shelf life and a difficulty to maintain the target hardness.

As to the soft cocoa butter fractions, they are obtained through 1- or 2-step fractionation of a cocoa butter which has first been subjected to an interesterification process.

WO 2010/149323 further described the use of soft cocoa butter fractions as spreads, such as chocolate and praline flavoured spreads. In such spreads, preferably cocoa butter super-olein will be used in combination with sugar, cocoa powder and/or cocoa mass, milk powder and lecithin, and optionally also hazelnut paste, whey powder and flavouring agents. WO 2010/149323 describes the recipes of the spreads. In particular, in example 7 of WO 2010/149323 the production of a chocolate spread, based on cocoa butter super-olein is described. Optimal organoleptic properties are obtained through the use of cocoa butter as ingredient and good functional properties in terms of no oiling-out and a stable texture are obtained, mainly through the use of an interesterification process, creating asymmetrical triglycerides, which show a low tendency to re-crystallise. However, the spreads remain to have a number of issues. First, the spreads do not have optimal nutritional properties. Based on the figures for cocoa butter super-olein in table 1 and 2, it can be concluded that the C16 and C18 contents are 19.73% and 26.34% respectively. This means that the SAFA content is at least 46.07%, which is quite high. Second, the texture of the spreads strongly depends on the temperature. The SFC profile at 20° C. is 4.62%, while at 10° C. it is already 25.99%. This sharp increase means that the product will be spreadable at room temperature, but when stored in the fridge it will be far too hard to be spread on the surface of a food product.

EP 2 443 935 A1 describes an edible product containing 15-80 wt % of triglycerides, 20-85 wt % of filler, and at most 15 wt % water, wherein the triglycerides contain as acid residues 20-70 wt % of total SAFA, at most 5 wt % of TFA, thereby C8, C10 and C12 in a weight ratio of (C8+C10+C12)/total SAFA of at least 10% and a weight ratio of (C8+C10)/C12 of at least 5%, whereby the weight ratio D/B is at least 1.5 and the weight ratio of B/total SAFA is at most 0.5, in which D represents the sum of the amounts of all monounsaturated fatty acid (MUFA) and polyunsaturated fatty acid (PUFA), and B represents the sum of the amounts of C14 and C16, and which triglyceride composition has an SFC at 20° C. of at least 5 wt %. EP 2 443 935 A1 further describes a process for the production of the edible product, and triglyceride compositions which are suitable intermediates for certain of the process variants. The fats that can be used are a combination of a non-lauric hard fat with high C18 content, a lauric fat and optionally a liquid oil. The edible products obtained have a firm structure, which makes them suitable for applications like fillings and creams. Preferred Solid Fat Content (SFC) at 20° C. is at least 10, preferably at least 15, most preferably at least 20 wt %. Preferably the non-lauric hard fat component has a melting point of at least 25° C., or at least 27° C. or most preferably at least 30° C. The preparation of the edible product requires no special processing in case the hard fat component contains a lauric fat: simple cooling may be applied without stabilization, similar to the common processing of lauric fats. This is an advantage of having a hard lauric fat component. However, disadvantage of such fats are their high SAFA content, for instance 90% for coconut oil, and the tendency to develop a soapy flavor upon storage. The SAFA content of the total fat composition is at least 20 wt % and maximum 70 wt %. In the Examples of EP 2 443 935 A1, the SAFA content is in the range of from 31 wt % to 64 wt %, mainly depending on the percentage of lauric fat component present in the fat blend.

WO 2011/161213 describes a non-temper, texture providing fat composition. This fat composition comprises 10-65 wt % of one or more vegetable oils having a slip melting point of no more than 25° C., and 35-90 wt % of one or more vegetable fats having a slip melting point of more than 25° C.; wherein in said one or more vegetable fats at least 90 wt % of the constituent fatty acid chains are longer than C12, the ratio of C16:0/C18:0-C24:0 is no more than 4, and the ratio SSU/SUS is at least 1, and wherein in said composition the content of S3-type of triglycerides is at least 0.5 wt %, wherein the groups S designates identical or different saturated fatty acids and the groups U designates identical or different unsaturated fatty acids. In a preferred embodiment, a SAFA content is of no more than 65 wt %. In the Examples, the SAFA content is in the range of from 39.4 wt % to 52.0 wt %. To obtain the non-temper texture providing properties, the presence of a considerable amount of asymmetrical SSU triglycerides is required as well as a minimum amount of high melting S3 triglycerides.

Optimal nutritional properties means no or negligible amount of trans fatty acids, a very limited amount of saturated fatty acids, whereby, for the kind of saturated fatty acids present in the fat component, those should be preferred with the lowest adverse cholesterogenic effects.

The nutritional properties of food products, and of oils and fats in particular are of increasing importance in view of the increasing awareness of an unbalanced diet and a lack of physical activity. These are the main risk factors for the incidence of cardiovascular diseases (CVD) and the main cause of mortality in more developed countries. There is more and more evidence supporting the correlation between the high levels of trans fatty acid residues and saturated fatty acid residues in the fats in the human diet and high cholesterol levels in the blood. There is also growing evidence supporting that different types of saturated fatty acid residues (i.e. differing according to chain length) may have different cholesterogenic effects. An analysis from designed controlled studies was made by H. Müller et al. (Lipids, Vol. 36, No. 8, pages 783-791 (2001)). H. Müller et al. describes predictive equations for total blood cholesterol and for LDL cholesterol levels, associated with the use of particular fatty acid residue. From this study a number of conclusions may be drawn: C14 acid residue has shown the highest hypercholesterolemic effect, 7 to 12 times higher than C12 acid residue. 016 acid residue is situated in between C12 and C14. Stearic acid residue is considered neutral. MUFA and PUFA are hypocholesterolemic, with the strongest effect shown for the PUFA.

Other authors have also drawn attention to the fact that different fatty acid residues may have different effects on LDL- and HDL-cholesterol (A. Aro, Lipid Forum Conference on Trans Fatty Acids, Aarhus (Dk) 2003). According to A. Aro, C14 acid residue increases LDL-cholesterol more than the HDL-type, while the opposite is stated for C12 acid residue. For C16 acid residue, this effect is stated to be even worse than for C14 acid residue.

From these and other studies it may then be concluded that MUFA and PUFA have hypocholesterolemic effects, C18 has a neutral effect, C12, C14 and C16 have a hypercholesterolemic effect, which is the strongest for C14 and C16.

Other products contain lower levels of SAFA, combining liquid oils with a fully hydrogenated fat, like palm fat, as a hardstock. However, consumers prefers non-hydrogenated fats, since the consumers associate hydrogenated fats with the presence of trans fatty acids. High melting fat components are also not preferred from an organoleptic point of view, since they melt much above body temperature.

Still another category combines non-hydrogenated palm oil with liquid oil. These products are confronted with a functional problem, in that upon storage, they exhibit a high risk of recrystallization. As a result of this, after a certain period, quite big crystals may appear in the product, giving it a grainy and unpleasant mouthfeel. To limit the risk of recrystallization, the presence of cocoa butter in such chocolate spreads is limited as much as possible. The fatty acid profile of these products can also be further approved.

Optimal organoleptic properties means that the product should have a nice melting in the mouth, meaning that no waxiness or graininess should be observed. There should be no development of soapy flavor, which is a risk that exists when using lauric fats. Preferably the recipe allows the use of a certain amount of cocoa butter or cocoa mass, imparting the real chocolate taste.

WO 2007090477 A1 describes structured, fat continuous edible products, wherein the edible products contain, expressed on total product basis, less than 30 wt %, less than 28 wt. %, preferably less than 25 wt. % of SAFA, between 20 and 100 wt % of a triglyceride composition, between 0 and 80 wt % of a filler material, less than 15 wt % of water and wherein the triglyceride composition contains with respect to the weight of the triglyceride composition, less than 45 wt % of SAFA, less than 10 wt % of trans unsaturated fatty acids, at least 8 wt % of SUS triglycerides, wherein S is a C16-18 SAFA, U is unsaturated fatty acid having at least 18 C atoms, less than 15 wt % of S3, at least 90 wt % of C8-18 fatty acids, at least 75 wt. % of C18 fatty acids including saturated and unsaturated fatty acids, has an SFC at 20° C. of between 5 and 50%.

Typical examples are given of creams that are made with fats having a SAFA content between 24% and 35% and an SFC at 20° C. of more than 15%, for example 18%. The creams obtained have a firm structure, for example more than 200 gr measured using an SMS-texture meter with a 3 mm diameter probe at 20° C., speed 0.5 mm/sec, depth 10 mm or more than 800 gr measured using an SMS-texture meter with a 6 mm diameter probe at 20° C., speed 0.5 mm/sec, depth 10 mm. The fats used are preferably a combination of a hard fat with a high StOSt-content and a liquid oil. The StOSt to POSt ratio of the triglyceride composition is preferable at least 2.5, preferably ate least 4, more preferably at least 5, most preferably at least 6.

In order to build a strong and stable structure, a tempering process is preferably applied, similar to that commonly used in the production of chocolate. Tempering can be done with a tempering machine, applying a cooling step, for instance to an optimal temperature between 22 and 28° C., followed by a reheating step, or the tempering can be obtained through addition of a temper seeding material, for instance at a temperature of 29° C.

WO 2016/032392 describes a process for preparing a cocoa biomass with a modified fat phase by mixing a cocoa biomass having a fat phase 1 with a vegetable fat phase 2, thereby forming fat phase 3 in the cocoa biomass, followed by separating fat phase 3 from the cocoa biomass to a desired level of the cocoa biomass. WO 2016/032392 demonstrates in example 6 how a cocoa powder with a modified fat phase can be used in a chocolate spread, while keeping the cocoa taste and with a longer shelf life without any recrystallization. The vegetable fat used to prepare the chocolate spread is a combination of 95% of sunflower oil with 5% of a high melting hard stock, consisting of 50% of fully hydrogenated palmstearine with 50% of fully hydrogenated High Erucic rapeseed oil. It is further demonstrated in tables 17 and 18 of WO 2016/032392 that only the spread with a very low amount of symmetrical SatOSat triglycerides keeps a better shelf life regarding recrystallization.

WO 2015/072913 describes a cocoa butter stabilizing vegetable fat composition, comprising components A and B, said component A being present in an amount of > or =50% (w/w) of said cocoa butter stabilizing fat composition, said component B being present in an amount of 1-12% (w/w) of said cocoa butter stabilizing fat composition, wherein said component A is an interesterified fat blend consisting of 3-25% C16:0+C18:0, 75-97% C18:1+C18:2, and C18:0/C16:0 is >1.0, StUU+UStU is >8% (w/w), where StUU and UStU are triglycerides and where St stands for stearic acid and U stands for C18:1 and C18:2, and component A having a slip melting point of <25° C., and wherein component B is a hardstock consisting of: 70-99% C16:0+C18:0, 1-30% C18:1+C18:2, and C18:0/C16:0>0.4. This cocoa butter stabilizing fat composition is typically used in a spreadable fat product, for instance in a chocolate spread. The improvements obtained with such composition appear to be a better spreadability over a wide temperature range, lower risk for oil separation or recrystallization, especially when the recipe contains high amounts of cocoa butter. WO 2015/072913 made use of an interesterification process that creates asymmetrical triglycerides, which decreases the tendency to re-crystallisation, as known from WO 2010/149323. It also uses a hardstock with a high melting point as can be seen from the high C16:0+C18:0 content of 70-99%. An example of such hardstock is a combination of shea oil with palmstearine. Palmstearine contains high amounts of tripalmitin, a triglyceride having a melting point of 66-67° C. The use of palmstearine to create heat stability and to bind oil is well known, e.g. from WO 2014/195498, discussed herein below. According to WO 2015/072913 the hardstock is needed to provide a suitable solid fat content to the composition and to ensure that no oil separation happens at a high temperature. Nonetheless, the working examples of WO2015/072913 are completely silent about the solid fat content at a higher temperature and possible effects thereof on the melting behaviour in the mouth.

WO 2014/195498 describes an edible composition comprising at least 20 wt % of a vegetable fat, from 0 to 5% wt % of water and from 0 to 80 wt % of other edible ingredients. The composition has a hardness of from 5 to 110 g, measured by a Brookfield texture Analyser CT3 1000 at 20° C. using a 4.5 mm probe, 5 mm depth at a speed of 0.5 mm/s and the fat has a SFC at 20° C. of from 5 to 22%. The objective was to provide edible products with a sufficiently hard structure, while using fats with a limited SAFA content. This could be achieved by making use of a composition produced by a process using liquefied or supercritical gas and by combining liquid oils with "a relatively low amount of high melting fat component, which usually comprises significant levels of SAFA". The presence of the high melting fat can also be seen in the SFC at 40° C., which is preferably between 3 and 15%. Preferred hard fats are palm oil stearine, e.g. with an IV between 8 and 20 or interesterified blends of palm stearine and palm kernel fat. Palm stearine with IV 14 has a SAFA content of 88% of which the large majority is palmitic acid (C16). Tripalmitin is a major triglyceride present in palmstearine, having a melting point of 66-67° C. Palmkernel fat is a lauric fat, of which the majority of SAFA consist of lauric (C12), myristic (C14) and palmitic acid.

The structured fats of WO 2014/195498 are softer than those of WO 2007090477 A1, which makes them fit for use in emulsified spreads, e.g. with a water content of 50%, as demonstrated in the examples.

The disadvantages of the solutions provided by WO 2014/195498 are the presence of high melting fat components, imparting a bad melting and waxiness in the mouth, upon eating. The fats also have a bad nutritional profile, the phenomenon of post-hardening of the filling can not be avoided (increase of hardness by 56% after 6 weeks storage).

EP 3 005 875 A1 describes a method for preparing a filled bakery product, the filling composition comprising at least one powdered food ingredient and a fat blend comprising from 15 to 67 wt % of a temper hard fat and from 85 to 33 wt % of a liquid oil, wherein the temper hard fat has a solid fat content of at least 60 wt % at 20° C., wherein the liquid oil has a solid fat content of less than 15 wt % at 20° C. and wherein the fat blend has a saturated fatty acid residue content of from 16 to 42 wt % and a polyunsaturated fatty acid residue content of less than 40 wt %, based on the total weight of fatty acid residues of the fat blend. The filling has preferably a low fat content e.g. from 23 to 33 wt %. The aim of this method was to make products that are more solid and less spreadable, compared to standard palm based fillings. Nut oils, like hazelnut oil, are considered as less preferred in this application.

It should be noted that in all these prior art documents, confectionery spreads are made starting from a fat having at least 5% solid fat content at 20° C. or containing a hardstock has a high melting point, such as more than 60° C., so that it is the fat that can provide sufficient structure to the final edible product. However, such fats are not suitable for making spreadable and fat-containing food products which are characterized by having an optimal healthy fatty acid profile combined with the right functional and organoleptic properties, i.e. with the right and stable structure and fulfilling the desired organoleptic requirements, such as good taste and nice melting in the mouth.

Hence, there is a strong need in this field to provide spreadable, fat-containing, food products having optimal nutritional properties, in terms of the SAFA-level and the types of SAFA present therein which have no or very low adverse effects on blood cholesterol, combined with having good organoleptic properties, i.e. have a nice melting in the mouth, and show no waxiness or graininess and having the right functional properties such as a stable structure upon storage, no re-crystallisation, no oiling out and a good heat stability.

SUMMARY OF THE INVENTION

The inventors have now surprisingly found that it is possible to provide spreadable, fat-containing, food products having a reduced SAFA-level fulfilling the above mentioned needs.

It is thus an object of the present invention to provide an edible product suitable for use as spreads comprising, based on the total weight of the edible product,
a) from 15 to 80 percentage by weight (wt %) of a glyceride composition [composition ($G_F$), herein after]
b) from 20 to 85 wt % of a fat free part comprised in at least one filler material, and
c) at most 20 wt % of water,
wherein the composition ($G_F$) comprises, with respect to the total weight of the composition ($G_F$):
d) from 5 to 20 wt % of saturated fatty acid residues (SAFA),
e) at most 3 wt % of trans unsaturated fatty acid residues (TFA),
f) at most 8 wt % of C12:0 fatty acid residues,
g) C14:0, C16:0 and C18:0 fatty acid residues wherein the weight ratio of (C14:0+C16:0)/C18:0 is at most 1.0, h) SUS-triglycerides [SUS, herein after] and SSU-triglycerides [SSU, herein after] wherein the weight ratio of SUS/SSU is more than 1.0, wherein S represents a saturated fatty acid residue having from 16 to 18 carbon atoms and U represents an unsaturated fatty acid residue having 18 or more carbon atoms, and wherein the composition ($G_F$) has i) a solid fat content (SFC) at 20° C. of less than 5 wt % and a SFC at 35° C. of less than 1 wt % wherein the SFC is measured according to International Union of Pure and Applied Chemistry (IUPAC) method 2.150 a, and wherein the edible product has j) a hardness (T) of maximum 1000 g and a ratio (R) between the hardness (T) and the SFC at 20° C., R=T/SFC20 of at least 125, whereby T is the hardness of the food product expressed in gram and measured with an SMS-texture meter type TA.XT plus at 20° C. using a metal or hard plastic cylindrical probe of a diameter of 10 mm, to a penetration depth of 10 mm at a probe speed of 0.5 mm/sec.

It is a further object of the present invention to provide a process for producing said edible product.

It is a further object of the present invention to provide a food product comprising said edible product.

DETAILED DESCRIPTION OF THE INVENTION

The Edible Product and the Food Product

An aspect of the present invention is an edible product suitable for use as spreads comprising, based on the total weight of the edible product, a) from 15 to 80 percentage by weight (wt %) of a glyceride composition [composition ($G_F$), herein after]

b) from 20 to 85 wt % of a fat free part comprised in at least one filler material, and c) at most 20 wt % of water, wherein the composition ($G_F$) comprises, with respect to the total weight of the composition ($G_F$):

d) from 5 to 20 wt % of saturated fatty acid residues (SAFA), e) at most 3 wt % of trans unsaturated fatty acid residues (TFA), f) at most 8 wt % of C12:0 fatty acid residues, g) C14:0, C16:0 and C18:0 fatty acid residues wherein the weight ratio of (C14:0+C16:0)/C18:0 is at most 1.0, h) SUS-triglycerides [SUS, herein after] and SSU-triglycerides [SSU, herein after] wherein the weight ratio of SUS/SSU is more than 1.0, wherein S represents a saturated fatty acid residue having from 16 to 18 carbon atoms and U represents an unsaturated fatty acid residue having 18 or more carbon atoms, and wherein the composition ($G_F$) has i) a solid fat content (SFC) at 20° C. of less than 5 wt % and a SFC at 35° C. of less than 1 wt % wherein the SFC is measured according to International Union of Pure and Applied Chemistry (IUPAC) method 2.150 a, and wherein the edible product has j) a hardness (T) of maximum 1000 g and a ratio (R) between the hardness (T) and the SFC at 20° C., R=T/SFC20 of at least 125, whereby T is the hardness of the food product expressed in gram and measured with an SMS-texture meter type TA.XT plus at 20° C. using a metal or hard plastic cylindrical probe of a diameter of 10 mm, to a penetration depth of 10 mm at a probe speed of 0.5 mm/sec.

In the context of the present invention, the expression "spreads" is intended to refer to food products with a maximum content of water of 20 wt %, based on the total weight of the food product, and which is characterized by a texture which makes the product spreadable, e.g. with a knife on a substrate such as on a slice of bread. Emulsified spreads, with a high water content, e.g. more than 30 wt % or even more than 50 wt % based on the total weight of the food product, are thus outside the scope of the present invention.

According to an advantageous embodiment of the present invention, the edible product suitable for use as spreads comprises water in an amount of at most 15 wt %, more preferably at most 10 wt %, even more preferably at most 5 wt %, most preferably at most 2 wt %, based on the total weight of the edible product.

Food products such as margarines wherein a large amount of water is introduced, typically leads to different food systems, for instance an oil-in-water (O/W) emulsion, whereby usually additives or selected ingredients and special processing techniques are used to stabilise the emulsion. According to a preferred embodiment of the present invention, the edible product therefore is not an emulsion, in particular not a water-in-oil (W/O) emulsion. These W/O emulsions, such as margarines, obtain their structure from specific emulsification and solidification techniques and the use of emulsifiers and thickening agents, and thus their structure differs from the structure of the edible product of the present invention. The edible product according to the present invention obtains its structure through different techniques from that of W/O emulsions.

The filler material used in the edible product of the present invention usually is a non-glyceride, edible solid material. Such filler material consists essentially of a fat free part. Said filler material is preferably a powdery product with a mean particle size of smaller than 500 μm, preferably smaller than 250 μm, most preferably smaller than 100 μm. A common filler material comprises at least one component selected from the group consisting of sugar, maltodextrin, inulin, stevia, sucralose, flour, starch, skimmed milk powder, whole milk powder, whey powder, lactose, cocoa powder, coffee powder, food grade inorganic solid powders or a blend of two or more of these. However, other fillers considered suitable by the person skilled in the art may be used as well.

The edible product according to the present invention may comprise filler materials which themselves comprise an oil or fat component, for instance nut paste, cocoa mass or oilseed paste. In that case that oil or fat component is considered as part of the composition ($G_F$) and the fat free part of such ingredients as part of the filler material.

Within the context of this invention, the fat composition containing the oil and fat components different to those oil and fat components comprised in the at least one filler material, which are as such added and which are also part of the composition ($G_F$) are further referred to as "added fat composition (A)".

Non limiting examples of nut paste are notably hazelnut paste, almond paste, wall nut paste, paste of cashew nuts or macadamia nuts or blends of two or more of the aforementioned nut pastes. It is preferred not to use groundnut paste, since quite a number of consumers show allergenic reactions to groundnuts. Nut paste gives a typical nut flavor to the spread, which is highly appreciated by the consumer. The nut paste also comprises healthy oils and is reach in vitamins and anti-oxidants.

Non limiting examples of oilseed paste are notably a paste from sunflower seeds or sesame seeds, or a combination thereof.

The edible product according to the present invention may also comprise chocolate as a filler material, such as notably dark, milk or white chocolate which is in general added as an ingredient as such. In general, this chocolate ingredient, will be molten, and can be mixed with other filler materials such as additional sugar or sugar replacers, optionally additional cocoa powder, milk powder, whey powder, optionally nut paste, for instance hazelnut paste Within the context of the present invention, when chocolate is the filler material itself than by chocolate, it is intended to refer to the product defined as chocolate in EU Directive 2000/36/EC. The advantage of such approach is that first a chocolate can be made with optimal flavor and eating properties. This can be done according to the typical chocolate processing, involving critical steps like refining and conching. The latter step is responsible for optimal flavor development. Such superior chocolate product may then be incorporated in notably chocolate spread, to develop a spread with a unique chocolate taste. This taste cannot be obtained through blending of all components straight away, to make a chocolate spread with the same composition.

According to an advantageous embodiment of the present invention, the edible product suitable for use as spreads comprises the fat free part comprised in the at least one filler material in an amount from 25 to 80 wt %, more preferably from 75 to 35 wt %, even more preferably from 70 to 50 wt %, based on the total weight of the edible product.

If more than one filler material is present in the edible product, it is understood that the sum of all the filler materials present should be in the ranges as specified.

According to an advantageous embodiment of the present invention, the edible product suitable for use as spreads comprises the composition ($G_F$) in an amount from 20 to 75 wt %, preferably from 25 to 65 wt %, even more preferably from 30 to 50 wt %, based on the total weight of the edible product.

The composition ($G_F$) comprised in the edible product of the present invention may comprise mono- and/or diglycerides but these will typically be present in smaller quantities than the triglycerides.

According to certain embodiments of the present invention, the composition ($G_F$) comprises the diglycerides in an amount of at most 5 wt %, preferably at most 3 wt %, more preferably at most 2 wt %, based on the total weight of the composition ($G_F$). In certain circumstances during refining, diglycerides can form unwanted chloro-propanol components.

The inventors have now found that the composition ($G_F$) comprised in the edible product suitable for use as spreads, as detailed above, is characterized by having a healthy nutritional profile, as detailed below.

The low levels of SAFA, being from 5 to 20 wt %, and the low levels of TFA, being at most 3 wt %, in the composition ($G_F$) of the edible product of the present invention provides a healthy nutritional profile to the edible product suitable for use as spreads of the present invention.

According to certain embodiments of the present invention, the SAFA content in the composition ($G_F$) is equal to or less than 18 wt %, preferably equal to or less than 16 wt %, more preferably equal to or less than 15 wt %, relative to the total weight of the composition ($G_F$).

According to certain embodiments of the present invention, the SAFA content in the composition ($G_F$) is advantageously in the range from 8 to 20 wt %, preferably in the range from 10 to 18 wt %, more preferably in the range from 10 to 16 wt %, more preferably in the range from 10 to 15 wt %, relative to the total weight of the composition ($G_F$).

According to certain embodiments of the present invention, the TFA content in the composition ($G_F$) of the edible product of the present invention is at most 2 wt %, more preferably at most 1 wt %, relative to the total weight of the composition ($G_F$).

Further the presence of fatty acids with an unhealthy profile is restricted by the limitation of the weight ratio of (C14:0+C16:0)/C18:0 fatty acid residues in the composition ($G_F$) of the edible product of the present invention to be at most 1.0, more preferably at most 0.75, and even more preferably at most 0.5.

The presence of lauric fats is limited by the content of C12:0 fatty acid residues in the composition ($G_F$) being at most 8 wt %. Lauric fats are highly saturated and their presence may create a soapy flavor.

According to certain embodiments of the present invention, the composition ($G_F$) comprises C12:0 fatty acid residues in an amount of at most 5 wt %, preferably at most 2 wt %, more preferably at most 1 wt %, relative to the total weight of the composition ($G_F$).

According to certain preferred embodiments of the present invention, the composition ($G_F$) is substantially free of hydrogenated fat components.

The term "hydrogenated fat components" refers to fat components that have been subjected to a hydrogenation process.

For the purpose of the present invention, the expression "substantially free of hydrogenated fat components" means that the content of hydrogenated fat components, relative to the total weight of the composition (GF), is less than 2.5 wt %, in particular less than 2.0 wt %.

The consumer prefers non-hydrogenated products because these are considered as being more natural. Also the consumer believes that hydrogenated products contain higher amounts of trans fatty acid residues, which is particularly valid for the partially hydrogenated products.

According to certain preferred embodiments of the present invention, the composition ($G_F$) is substantially free of fat components being derived from genetically modified sources.

For the purpose of the present invention, the expression "substantially free of fat components being derived from genetically modified sources" means that the content of fat components being derived from genetically modified sources, relative to the total weight of the composition ($G_F$), is less than 0.9 wt %.

As said, consumers prefer natural fats.

According to certain preferred embodiments of the present invention, the composition ($G_F$) has not been modified by an interesterification process, for instance a chemical interesterification or an enzymatic interesterification with the purpose to randomize the glyceride composition. For the same reason it is preferred that, when fractions of natural fats are present, these fractions have been obtained with a dry fractionation process, without using any solvents.

It is essential that the weight ratio of SUS/SSU in the composition ($G_F$) of the edible product of the present invention is at least 1, preferably at least 1.5, and more preferably at least 2.0. SSU-triglycerides are mainly present in interesterified fats. Therefore, their presence should be limited so that the edible products of the present invention suitable for use as spreads have the desired structure in which the amount of solid fat in the composition ($G_F$) at 20° C. is limited to less than 5 wt % and less than 1 wt % at 35°

C. This means that the fat melts nicely at body temperature without any sign of waxiness.

According to certain embodiments of the present invention, the composition ($G_F$) composition has an solid fat content (SFC) at 20° C. (SFC20) of less than 5 wt %, preferably less than 4 wt %, more preferably less than 3 wt %, relative to the total weight of the composition ($G_F$).

According to certain embodiments of the present invention, the composition ($G_F$) composition has an solid fat content (SFC) at 35° C. (SFC35) of less than 0.8 wt %, preferably less than 0.5 wt %, relative to the total weight of the composition ($G_F$).

According to certain embodiments of the present invention, the composition ($G_F$) composition has an SFC at 25° C. (SFC25) of less than 2.0 wt %, preferably less than 1.0 wt %, relative to the total weight of the composition ($G_F$).

According to certain preferred embodiments of the present invention, the composition ($G_F$) composition has a SFC at 10° C. (SFC10) relative to SFC20 as such that the difference SFC10-SFC20 is less than 8, preferably less than 6, and more preferably less than 4. This results in having edible products suitable for use as spreads, such as chocolate spreads, which can be easily stored in the frigo without becoming completely hard and stiff. This is typically the case when such spreads are produced using a fat like palm oil and/or palm oil fractions, then the consumer gets confronted with a product, that at room temperature is soft and spreadable, but when stored in the fridge gets completely hard and stiff.

The SFC is measured according to IUPAC method 2.150a.

Despite the fact that the amount of solid fat at 20° C. in the composition ($G_F$) is very limited (i.e. (SFC20) of less than 5 wt %), as detailed above, which is linked to the low SAFA content of the composition ($G_F$), the Inventors have surprisingly found that the edible product of the present invention is characterized by a ratio, R=T/SFC20 of at least 125, as detailed above. This provides the edible product of the present invention a nice and stable hardness (T) at 20° C. This high value for R=T/SFC20 of at least 125, is unexpected and indicates that the texture of the edible product of the present invention is much firmer than could be foreseen based on the SFC20 value. In fact with such low amounts of solid fat, the Inventors have surprisingly found that no heavy oiling out of the liquid oil from the solid matrix was observed, as demonstrated in the examples below.

According to certain embodiments, the edible product according to the invention is characterised by a ratio R=T/SFC20 of at least 150, more preferably at least 200, even more preferably at least 300, most preferably at least 500.

It is further understood that if the SFC at 20° C. is 0, and a hardness can be measured, then the R value is more than 500.

As said, it is further essential that the edible product has a hardness (T) of maximum 1000 g, since products with a higher hardness are hardly spreadable at room temperature. This temperature is however not a limitation, since there may be an interest in spreadable products at higher or lower temperatures than room temperature.

According to an advantageous embodiment, the edible product according to the invention has a hardness (T) of maximum 800 g, preferably of maximum 600 g, more preferably of maximum 500 g. On the other hand, the hardness (T) of the edible product is preferably at least 25 g, more preferably at least 35 g. This results in having edible products which are not too liquid or too hard. Too liquid products risk to leak through the substrate while too hard product are not well spreadable. Moreover, both of them do not provide the expected mouthfeel upon eating.

As said, the hardness (T) of the edible product according to the invention is expressed in gram and measured with an SMS-texture meter type TA.XT plus at 20° C. using a metal or hard plastic cylindrical probe of a diameter of 10 mm, to a penetration depth of 10 mm at a probe speed of 0.5 mm/sec.

As will be demonstrated in the examples, the Inventors have further found that edible products according to the invention demonstrate a remarkable resistance to changes in temperature, in particular in a range from 20 to 25° C. For example, when said edible products are exposed to higher temperatures, in particular at 25° C. and come back to their original temperature, e.g. 20° C., their texture returns back to the original level at that temperature, without demonstrating any substantial risk for recrystalliation or for development of graininess or oiling out, despite the very limited amount of solid fat at 20° C. and 25° C. in the composition ($G_F$).

Accordingly, the edible products according to the present invention are advantageously characterized by a ratio $T_{20\text{-}25\text{-}20}/T_{20}$ of between 0.7 and 1.3, preferably between 0.75 and 1.25, whereby $T_{20}$ is the hardness of the edible products which have been stored during 1 week at 20° C. and $T_{20\text{-}25\text{-}20}$ is the hardness of the edible products which has been first stored for 1 week at 20° C., followed by storage for 3 days at 25° C., followed by storage at 20° C. for 1 day. It is further understood that the hardness parameter (T) itself has been measured at measured with an SMS-texture meter type TA.XT plus at 20° C. using a metal or hard plastic cylindrical probe of a diameter of 10 mm, to a penetration depth of 10 mm at a probe speed of 0.5 mm/sec.

As discussed above, the hardstocks of the prior art being fat compositions with a high melting point were used to provide structure and/or heat resistance to fat compositions that comprise considerable amounts of liquid oils. Their disadvantage however is that they do not melt at body temperature and that they may have a negative effect on organoleptic properties.

Accordingly, the edible products according to the present invention advantageously comprise hardstocks having a melting point of more than 50° C., preferably more than 55° C. in an amount of less than 0.75 wt %, more preferably less than 0.5 wt %, most preferably less than 0.2 wt %, based on the total weight of the composition (GF) in the edible product.

Such hardstocks can in general be obtained by fractionation of palm oil, or by full hydrogenation of an oil or fat, or by a combination of both.

This being said, the Inventors have now found that in the present invention it is possible to make edible products with a nice structure and heat resistance, without using such high melting fats.

According to certain preferred embodiments of the present invention, the composition ($G_F$) comprised in the edible product comprises at least one hard or semi hard fat component and at least one liquid component.

Within the context of the present invention, the liquid component is at least one liquid oil or a mixture of two or more liquid oils.

For the purpose of the present invention, the term "a hard or semi-hard fat" is intended to denote a fat which is a solid or semi-solid fat at room temperature (i.e. 23° C.), preferably with a melting point of at least 25° C.

For the purpose of the present invention, the term "a semi-solid fat" is intended to denote a fat which at room temperature comprises a visible part of solid fat together with a visible part of liquid oil.

Thus, it is understood that a hard fat is a fat that at room temperature has a uniform hard structure, while a semi-hard fat contains at room temperature at least a substantial amount of visible solid fat.

For the purpose of the present invention, the term "a liquid oil" is intended to denote an oil which is fully liquid at room temperature.

Preferably, in the composition ($G_F$), the amount of the hard or semi-hard fat component is present in the range from 5 to 30 wt %, preferably from 7 to 20 wt %, more preferably from 8 to 16 wt %, most preferably from 9 to 14 wt % and the amount of the at least one liquid oil is present in the range from 70 to 95 wt %, preferably 80 to 93 wt %, more preferably 84 to 92 wt %, most preferably from 86 to 91 wt %, and all ranges are based on the weight of the composition ($G_F$).

The amounts of the hard or semi-hard fat component and liquid oil component may vary, mainly depending on the hardness of the hard or semi-hard fat which has been chosen as component.

The liquid oil chosen as the liquid oil component or as part of the liquid oil component is preferably a vegetable oil selected from the group of rapeseed oil, corn oil, soybean oil, sunflower seed oil, cotton seed oil, maize oil, olive oil, hazelnut oil, groundnut oil, liquid fractions of palm oil or of shea butter, a blend of two or more of these liquid oils. This includes also varieties of these liquid oils, such as for instance, but not limited to, high oleic sunflower oil and high oleic rapeseed oil. Most preferred are liquid oils from oilseeds, beans or nuts since they are less saturated than liquid fractions from harder oils and fats and since they offer the opportunity to incorporate polyunsaturated fatty acid (PUFA), which have a stronger cholesterol lowering effect than monounsaturated fatty acid (MUFA). On the other hand high oleic sunflower oil and high oleic rapeseed oil may be preferred because of their strong oxidation stability. Another advantage of these oils is that they have on average a lower contamination level with mineral oil hydrocarbons than oils or fractions of oils, coming from tropical origin, such as palm oil, palm kernel oil or coconut oil. So preferably the liquid oil comprised in the composition ($G_F$) of the edible products of the present invention, contains no olein fractions.

According to certain embodiments of the present invention, the hard or semi-hard fat component and liquid oil component are part of the added fat composition (A), as defined above.

According to certain embodiments of the present invention, the hard or semi-hard fat component and liquid oil component may also be part of the at least one filler material, as defined above.

This being said, the liquid oil or the majority of the liquid oil may be added to the recipe as an oil component, but it may also be an oil which is part of a filler material, such as the oil which may be contained in ground nuts or seeds, as detailed above.

According to certain preferred embodiments of the present invention, the hard or semi-hard fat chosen as the hard or semi-hard fat component or as part of the hard or semi-hard fat component has preferably a melting point of at least 25° C., preferably at least 27° C., most preferably at least 30° C. The use of such fats brings the advantage of providing structure to the final product.

According to certain preferred embodiments of the present invention, the hard or semi-hard fat chosen as the hard or semi-hard fat component or as part of the hard or semi-hard fat component is preferably a fat which comprises at least 50 wt %, preferably at least 60 wt %, more preferably at least 70 wt % of S2U-triglycerides [S2U, herein after], based on the weight of the hard or semi-hard fat component whereby the ratio of the S2U/S3 content is at least 10, preferably at least 15, most preferably at least 20 and wherein S represents a saturated fatty acid residue having 16 to 18 carbon atoms and U represents an unsaturated fatty acid residue having 18 or more carbon atoms.

It is understood that the term "S2U-triglycerides (52U)" covers SSU-glycerides [SSU, herein after] and SUS-triglycerides [SUS, herein after]. The term "SSS-triglycerides" is herein after referred to as S3 glycerides.

Both S2U and S3 triglycerides can provide a solid structure at room temperature, but S3 triglycerides have a clearly higher melting point, imparting a waxy mouthfeel upon eating.

According to certain preferred embodiments of the present invention, in the hard or semi-hard fat component, the ratio of SUS/SSU triglycerides is more than 1, preferably more than 2, more preferably more than 3, most preferably more than 4. In natural, unmodified fats of vegetable origin, triglycerides with an unsaturated fatty acid in the sn-2 position are most common. In this sense symmetrical SUS triglycerides can be found in natural fats like cocoa butter, shea butter or palm oil, while asymmetrical SSU-triglycerides are a minority. Asymmetrical triglycerides are typically present in fat compositions which have been randomized by chemical or enzymatic interesterification.

The edible product according to the invention is preferably a spread such as a chocolate spreads, nut spreads, soft cream, like scoopable cream, and the like.

It is generally known that symmetrical triglycerides impart the risk of recrystallization, causing a change in texture and a possible development of graininess. This risk is high, especially in an environment where high amounts of liquid oil are present. For this reason, the chocolate spreads known in the art which comprise substantial amounts of liquid oils, can only be produced by using defatted cocoa powder, for instance with a cocoa butter content of 10-11 wt %. As a consequence of this limitation, healthy chocolate spreads with a clear and optimal chocolate flavor, by using cocoa butter or cocoa mass as an ingredient, are not available on the market.

The inventors have now surprisingly found that the edible products, in particular chocolate spreads, according to the invention may contain substantial amounts of cocoa butter or cocoa mass, while it is possible to maintain a stable texture without the risk of developing graininess.

It is understood that chocolate spreads are edible products and are spreads, as defined above, but with a connotation or a link to chocolate, be it dark, milk or white chocolate or a blend of two or more of the aforementioned chocolates, due to the presence of a typical chocolate ingredient, such as cocoa butter, cocoa mass, cocoa powder, or even due to the presence of a chocolate flavouring agent. The word "chocolate" does not imply any limitation to products which can be legally called "chocolate", but refers rather to chocolate like products, since a link can be made to real chocolate, as explained above.

On the contrary, as explained above, when chocolate is the filler material itself than by chocolate, it is intended to refer to the product defined as chocolate in EU Directive 2000/36/EC.

According to a preferred embodiment of the present invention, in the hard or semi-hard fat component, the ratio of S2U/SU2 triglycerides is more than 1, preferably more than 2, most preferably more than 3.

SU2-glycerides [SU2, herein after] is liquid at room temperature. It is preferred that the liquid part of the glyceride mainly consists of UUU-glycerides [U3-triglycerides, herein after], due to their lower SAFA-content.

The hard or semi-hard fat chosen as the hard or semi-hard fat component or as part of the hard or semi-hard fat component is preferably a vegetable fat selected from the group of cocoa butter, cocoa butter stearine, shea butter or shea stearine, sal fat or sal stearine, mango fat or mango stearin, illipe butter, kokum butter, allanblackia fat, or enzymatically prepared fat, or a blend of two or more of the afore mentioned oils and/or fractions thereof.

When shea butter or shea butter fractions are used as a hard or semi-hard fat component in the composition ($G_F$), it is preferred that the content of unsaponifiable matter in these components is limited to maximum 5 wt %, preferably less than 4 wt %, most preferably less than, 3 wt % based on the weight of the composition ($G_F$).

According to certain preferred embodiments of the present invention, in the hard or semi-hard fat, cocoa butter and/or cocoa butter fractions are present in an amount of at least 20 wt %, preferably at least 30 wt % based on the weight of the hard or semi-hard fat.

The cocoa butter and/or cocoa butter fractions can be present as a pure fat, but cocoa butter can also be present in cocoa mass or cocoa powder. This presence is preferred to enhance chocolate taste. Cocoa butter contains also POSt triglycerides, which have a better melting in the mouth than StOSt triglycerides. In the context of the present invention, it is understood that P means palmitic acid, St is stearic acid and O means oleic acid. Preferably the POSt content on total S2U triglycerides represents 10 to 30 wt % based on the total weight of S2U triglycerides, more preferably 15 to 25 wt %. Another advantage of cocoa butter is that it is a natural hard butter, that can be applied without fractionation. However in certain circumstances, there may also be reasons, to choose even a hard fraction of cocoa butter.

According to a preferred embodiment of the present invention, the composition ($G_F$) comprised in the edible product preferably comprises substantially no palm oil or fractions thereof. Certain consumers prefer food products without palm oil. Therefore, the edible product according to the present invention can offer an alternative to products based on or containing palm oil.

In view of the above, the composition ($G_F$) comprised in the edible product of the present invention has a healthy nutritional profile, and the edible products have a stable structure upon storage, and they have a nice, creamy melting in the mouth, since they contain no substantial amounts of high melting triglycerides compositions, as detailed above.

According to a preferred embodiment of the present invention, the edible product is a fat continuous edible product. In the context of the present invention, fat continuous products are products in which the continuous phase is formed by the fat (i.e. the composition ($G_F$)).

In the context of the present invention, it is understood that the amount of the composition (GF) present in the edible product should be sufficient to build a fat-continuous product with a good spreadability. The amount of fat should not be too high as fat is responsible for a high energy content which is considered less healthy.

The edible product according to the present invention may further optionally comprise at least one additive such as flavours, colorants or additives to regulate its rheology like for instance lecithin, or PGPR. If present, the total amount of the at least one additive in the edible product according to the present invention is less than 5 wt % based on the total weight of the product.

Another aspect of the present invention is the use of the edible product, as detailed above, in the process for the manufacture of a food product.

The present invention further relates to the food product comprising the edible product of the present invention, as detailed above.

The food product is advantageously selected from the group consisting of a filled chocolate product, baked products with a filling, a biscuit having a cream layer sandwiched between two or more biscuits, a filled or topped confectionery product, a filled or topped culinary product, product, a frozen edible product covered with a coating.

Process for Producing an Edible Product

For producing the edible product of the present invention, several processes may suitably be used.

It is further understood that all definitions and preferences as described above equally apply for this embodiment and all further embodiments, as described below.

In a preferred embodiment of the present invention, the process for producing the edible product, suitable as spread, as detailed above, comprises the steps of blending, based on the total weight of the edible product,
  a) from 15 to 80 wt %, preferably from 20 to 75 wt %, more preferably from 25 to 65 wt %, even more preferably from 30 to 50 wt % of the composition ($G_F$), as defined above, being in an at least partly molten form,
  b) from 20 to 85 wt %, preferably from 25 to 80 wt %, more preferably from 75 to 35 wt %, even more preferably from 70 to 50 wt % of the fat free part of the at least one filler material, as defined above, and
  c) at most 20 wt %, preferably at most 15 wt %, more preferably at most 10 wt %, even more preferably at most 5 wt %, most preferably at most 2 wt % of water.

According to a first embodiment of the present invention, the process for producing the edible product, suitable as spread, as detailed above, preferably comprises the step of mixing of (i) of the added fat composition (A), as detailed above, which is in an at least partly molten form, (ii) of the at least one filler material, as detailed above, (iii) optionally water, and (iv) optionally the at least one additive, thereby obtaining a mixture (1).

In this first embodiment of the present invention, during said step of mixing or after the formation of the mixture (1), the process preferably further comprises at least a step of cooling and agitation such as stirring, to at least a temperature at which the spreadability value of the mixture (1) starts increasing by at least 25% over a temperature range of 1° C., and whereby that temperature is preferably below 20° C., more preferably below 18° C., and most preferably below 17° C.

In the context of the present application, the spreadability value is the peak force or the maximum force to shear, in a performed with a Texture Analyzer from Stable Micro Systems, equipped with a TTC Spreadability test Fixture type HDP/SR. The TTC Spreadability Fixture is a set of precisely matched male and female perspex 90° cones. The female part has an upper diameter of 39 mm. The material to be measured is brought into the female cone by means of a spatula. Care is taken to keep deformation during sample preparation to a minimum. The female cone is placed in the sample holder. Measurement is always started from a male cone position above the product surface, till a distance of 2 mm above the lowest surface of the female cone. During measurement, the sample is squeezed out with a probe speed of 0.3 mm/sec.

Suitable devices to execute above process may be scraped surface heat exchangers or tempering machines able to handle high viscosity confectionery products.

In this first embodiment of the present invention, the process can also comprise a heating step during said step of mixing or after the formation of the mixture (1) but prior to the cooling step, to a temperature whereby at least 90 wt %, preferably at least 95 wt %, most preferably at least 98 wt % of the added fat composition (A) is obtained in the molten form. At said temperature a better mixing of (i) of the added fat composition (A), as detailed above, (ii) of the at least one filler material, as detailed above, (iii) optionally water, and (iv) optionally the at least one additive can be realized by stirring or agitation.

According to a second variant embodiment, the edible product, suitable as spread, according to the invention, can also be produced by mixing an edible product (B) and an edible product (C) thereby forming the edible product, as detailed above, wherein the edible product (B) comprises at least one fat component (B), and at least one filler material (B), and wherein the edible product (C) comprises at least one fat component (C), and optionally at least one filler material (C), and wherein the edible product (B) is a non-stabilised edible product and the edible product (C) is a stabilized edible product.

Within the context of the present invention, a stabilized edible product is intended to refer to an edible product which contains a minimum working amount of at least one crystallised fat component in the Beta-form.

Within the context of the present invention, a non-stabilized edible product is intended to refer to an edible product which has not undergone a stabilization step towards Beta form.

It is further understood that the skilled in the art will select the at least one fat component (B), the at least one fat component (C), the at least one filler material (B) and optionally the at least one filler material (C) in such a manner that the edible product comprises, based on the total weight of the edible product, a) from 15 to 80 wt %, preferably from 20 to 75 wt %, more preferably from 25 to 65 wt %, even more preferably from 30 to 50 wt % of the composition ($G_F$), as defined above, b) from 20 to 85 wt %, preferably from 25 to 80 wt %, more preferably from 75 to 35 wt %, even more preferably from 70 to 50 wt % of the fat free part of the at least one filler material, as defined above, and c) at most 20 wt %, preferably at most 15 wt %, more preferably at most 10 wt %, even more preferably at most 5 wt %, most preferably at most 2 wt % of water.

Preferably, the stabilized edible product (C) comprises at least one hard or semi-hard fat component and at least one liquid oil, wherein the weight amount of the at least one hard or semi-hard fat component, relative to the total weight of the composition ($G_F$) in the stabilized edible product (C) is preferably in the range from 5 to 50 wt %, preferably from 7 to 30 wt %, more preferably from 8 to 20 wt %, and the weight amount of the at least one liquid oil is in the range from 50 to 95 wt %, preferably 70 to 93 wt %, more preferably from 80 to 92 wt %, relative to the total weight of the composition ($G_F$) in the stabilized edible product (C).

In this second variant embodiment in the process for producing the edible product, suitable as spread, according to the invention, the stabilized edible product (C) is preferably mixed with the edible product (B) in an amount ranging between 0.1 and 30 wt %, preferably between 0.5 and 20 wt %, more preferably between 0.7 and 10 wt %, most preferably between 1 and 5 wt %, based on the total weight of the edible product.

In this second variant embodiment in the process for producing the edible product, suitable as spread, according to the invention, it is more preferred that the stabilized edible product (C) and the edible product (B) comprises the same added fat composition (A), as detailed above, the same at least one filler material, as detailed above, optionally water and optionally the same at least one additive, as those comprised in the edible product to be obtained.

In this this second variant embodiment, the mixing of the edible product (B) and the stabilized edible product (C) can be carried out by using notably a static or dynamic mixing device which is installed after the addition point of both streams, in particular a stream comprising the edible product (B) and a stream comprising the stabilized edible product (C). This can optionally be followed by a buffer tank to give the edible product obtained (i.e. the edible product according to the invention, some extra residence time to stabilize. Then the edible product obtained may be transported by means of a pump to a depositing line. It is possible that the edible product obtained gets deposited on an edible substrate, for instance a baked or frozen food product or it can be deposited in glass jars or in plastic pots in a filling line. After depositing, a cooling step may be present, for instance by means of a cooling tunnel, or another option may be that the jars or pots are stored in a cooled storage, sufficiently long to stabilize the edible product obtained. The temperature of this storage may be for instance between 16 and 21° C. The edible product obtained, after such cool storage, is considered stable when it gets a texture (i.e. the hardness parameter (T)); measured at 20° C. which is at least 70% of the texture (i.e. the hardness parameter (T)) it will get after 1 week storage at 20° C.

As said above, the hardness parameter (T) itself is measured with an SMS-texture meter type TA.XT plus at 20° C. using a metal or hard plastic cylindrical probe of a diameter of 10 mm, to a penetration depth of 10 mm at a probe speed of 0.5 mm/sec.

If the edible product according to the invention is further used for stabilization of the edible product (B) then the edible product obtained, according to one of the above described processes, is preferably stored for at least 15 minutes, preferably at least 30 minutes, more preferably at least 1 hour, most preferably at least 2 hours for further stabilization of the edible product obtained prior to be mixed with the edible product (B).

Preferably this storage is done at a temperature between 17 and 25°. This may involve a heating or cooling step prior to this storage, depending on the stabilization process that was applied. After this storage, the stabilized product may be slightly heated, to less than 28° C., preferably less than 26° C., in order to decrease its viscosity, make it pumpable and well miscible with the non-stabilized edible product (B).

According to a further specific preferred embodiment of the above-mentioned process, at least part of the stabilized edible product obtained according to the invention, as described above, is recycled to the point where stabilized and non-stabilized edible products get mixed. The recycled product may first pass through an intermediate storage vessel where it is stored at ideal temperature, residence times and conditions to get well stabilized before it gets blended with non-stabilised product. The ideal temperature is in the range of between 17 and 25°, the residence time is at least 15 minutes, preferably at least 30 minutes, more preferably at least 1 hour, most preferably at least 2 hours.

It is further understood that the stabilized edible product (C) may be produced according to the process described in the first embodiment, as detailed above, or alternatively according to the process described in the second variant embodiment, as detailed above, or by using any other suitable process including at least one stabilization step.

Glyceride composition and the use thereof.

Another aspect of the present invention is a glyceride composition suitable for the production of the edible product according to the invention as detailed above, wherein a glyceride composition is a non-hydrogenated composition and wherein said glyceride composition comprises, with respect to the total weight of the glyceride composition:

a) less than 20 wt %, more preferably less than 18 wt %, more preferably less than 16 wt %, most preferably less than 15 wt % of saturated fatty acid residues (SAFA), b) less than 3 wt % of trans unsaturated fatty acid residues (TFA), c) less than 8 wt % of C12:0 fatty acid residues, d) C14:0, C16:0 and C18:0 fatty acid residues wherein the weight ratio of (C14:0+C16:0)/C18:0 is at most 1.0, more preferably at most 0.75, most preferably at most 0.5, and wherein the glyceride composition has e) a solid fat content (SFC) at 20° C. of less than 4 wt %, more preferably less than 3 wt % wherein the SFC is measured according to IUPAC method 2.150 a., and wherein the glyceride composition comprises at least one hard or semi-hard fat obtained by fractionation and with a melting point of at least 25° C. and at least one liquid oil with a melting point of less than 25° C.

The advantage of hard fractions is that they generally have a low content of mineral oil contamination, which is generally also the case for liquid oils. So, from a food safety point of view, above glyceride compositions have a clear advantage.

The present invention is further illustrated by the examples and comparative examples given below.

All blending ratios, contents and concentrations in this text are given in weight units and weight percent, unless stated otherwise.

Comparative Example 1: Commercial Available Spreads

Comparative sample 1: a hazelnut containing chocolate spread of the brand Becel

Comparative sample 2: a chocolate spread of the brand Côte d'Or type milk spread Comparative sample 3: a chocolate spread of the brand Kwatta Comparative sample 4: a hazelnut containing chocolate spread of the brand Jean Hervé

The comparative samples were analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 1. In this context, SFCnn represents the SFC at nn° C. in weight percent, the SFC being measured according to IUPAC method 2.150 a.

TABLE 1

|  | Comp. sample 1 | Comp. sample 2 | Comp. sample 3 | Comp. sample 4 |
|---|---|---|---|---|
| Fat content (i.e. the composition ($G_F$), wt %) | 35 | 38.5 | 36.0 | 39.3 |
| Fat characteristics (wt %) | | | | |
| Hydrogenated fat components | yes | no | no | no |
| Diglyceride components (wt %) | 0.9 | 3.4 | 6.2 | 12.1 |
| Nut paste | yes | no | no | yes |
| Fatty acid residue concentrations (wt %) | | | | |
| C12:0 | 0.1 | 0.1 | 0.4 | 0.1 |
| (C14:0 + C16:0)/C18:0 | 1.7 | 6.1 | 6.2 | 1.6 |
| SAFA | 11.6 | 23.4 | 25.8 | 14.5 |
| TFA | <1 | <1 | <1 | <1 |
| SFC profile and hardness | | | | |
| SFC20 | 1.75 | 3.89 | 5.67 | 0.10 |
| SFC35 | 0.46 | 0.57 | 0.89 | 0.00 |
| hardness (T)[a] | 73 | 212 | 274 | 8 |
| R = T/SFC20 | 41 | 54 | 48 | 80 |

[a]T is the hardness of the food product expressed in gram and measured with an SMS-texture meter type TA.XT plus at 20° C. using a hard plastic cylindrical probe of a diameter of 10 mm, to a penetration depth of 10 mm at a probe speed of 0.5 mm/sec.

Comp Sample 1 shows a slight tendency to oiling out, which can be explained by its low SAFA-content and its low SFC at 20° C. Another disadvantage is that it contains a hydrogenated fat as hardstock. In the SAFA, the atherogenic fatty acids are in the majority.

Comp Sample 2 has a dull surface with signs of re-crystallisation. The label contains a warning "the presence of cocoa can eventually cause a light crystallization caused by temperature fluctuations, without negative influence on taste". It is further advised not to put the product in the fridge. This product has a higher SAFA content and a high C16:0 content which can be explained by the presence of palm oil as ingredient.

Comp Sample 3 has a shiny surface. The product has a higher SAFA content and a high C16:0 content which can be explained by the presence of palm oil as ingredient.

Comp Sample 4 shows a very strong tendency to oiling out, which can be explained by its low SAFA-content and its very low SFC at 20° C. The label contains a warning: "oil separation is normal; reheat and mix before use, if necessary".

The experimental data in table 1 clearly demonstrate that none of these commercial available samples combines an optimal nutritional profile with optimal physical characteristics, such as no oiling out or no recrystallization.

Comparative Example 2 and Example 3

Comparative Fat blend 2 with a SAFA-content of 18.8% was prepared by blending of molten shea stearin and a liquid oil.

Fat blend 3 with a SAFA-content of 14.8% was prepared by blending molten shea stearin and a liquid oil.

Comparative spread 2 and spread 3 were prepared using the corresponding Comparative Fat blend 2 and Fat blend 3, respectively, thereby applying the following recipe 1, as shown in table 2.

TABLE 2

| | |
|---|---|
| Sugar | 47% |
| Fat blend | 33% |
| Whole milk powder | 9% |
| Skimmed milk powder | 6% |
| Whey powder | 5% |
| Lecithin | 0.4% |
| Vanillin | 0.05% |

The fat compositions (i.e. the composition ($G_F$)) present in the recipe contain above fat blends as well the milk fat present in the milk powder and they have characteristics as shown in table 3, below.

Preparation of the Comparative Spread 2 and Spread 3 According to a General Procedure of Deep Cooling:

The different ingredients as listed in table 2, above were mixed. The mixture obtained was brought into a metal bowl, of which the bottom was put into a water bath at 12° C. The mixture was subjected to cooling under continuous stirring and scraping until it started to thicken and started to build structure thereby forming the spread.

Comparative spread 2: For the preparation of Comparative spread 2, the mixture comprising the comparative Fat blend 2 with a SAFA-content of 18.8% had to be cooled to a temperature of 18.6° C. Then it started to thicken, the cooling was stopped and the spread obtained was kept at 20° C.

Spread 3: For the preparation of spread 3, the mixture comprising the Fat blend 3 with a SAFA-content of 14.8% had to be cooled to a temperature of 16.5° C. Then it started to thicken, the cooling was stopped and the spread obtained was also kept at 20° C.

The comparative spread 2 and spread 3 were analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 3. In this context, SFCnn represents the SFC at nn° C. in weight percent, the SFC being measured according to IUPAC method 2.150 a.

TABLE 3

| | Comparative spread 2 | Spread 3 |
|---|---|---|
| Total Fat Content (i.e. the composition ($G_F$), wt %) | 35.4 | 35.4 |
| Fat characteristics (wt %) | | |
| Hydrogenated fat components | no | no |
| Diglyceride components (wt %) | 2.1 | 2.0 |
| Nut paste | no | no |
| Fatty acid residue concentrations (wt %)-triglycerides | | |
| C12:0 | 0.49 | 0.47 |
| (C14:0 + C16:0)/C18:0 | 0.57 | 0.79 |
| SAFA | 22.2 | 18.5 |
| TFA | <0.1 | <0.1 |
| SUS/SSU | >1 | >1 |
| SFC profile and hardness | | |
| SFC20 | 6.37 | 0.78 |
| SFC25 | 1.19 | 0.29 |
| SFC35 | 0.39 | 0.00 |
| hardness (T)[a] | 1870 | 404 |
| R = T/SFC20 | 292 | 505 |

[a] T is the hardness of the food product expressed in gram. The hardness (T) of the comparative spread 2 and spread 3 was measured after 1 week with an SMS-texture meter type TA.XT plus at 20° C. using a metal cylindrical probe of a diameter of 10 mm, to a penetration depth of 10 mm at a probe speed of 0.5 mm/sec.

Comparative spread 2 is not an edible product according to the invention, since it has a too high SAFA content. The texture of this product is also too hard to be suitable as a spread.

Spread 3 is an edible product according to the invention. Remarkable about this spread 3 is that it has a soft but stable texture at room temperature, while it contains only 0.78% solid fat at 20° C.

Example 4

Fat blend 4 was prepared by blending 11.5% of molten shea stearin and 88.5% High Oleic Sunflower Oil (HO SFO).

A chocolate hazelnut spread 4 was prepared using Fat blend 4, thereby applying the following recipe 2, as shown in table 4.

TABLE 4

| | |
|---|---|
| Sugar | 46.50% |
| Fat blend 4 | 20.50% |
| Hazelnut paste | 15.00% |
| Cocoa powder | 9.00% |
| Skimmed milk powder | 5.00% |
| Whey powder | 4.00% |
| Lecithin | 0.40% |
| Vanillin | 0.05% |

The fat composition (i.e. the composition ($G_F$)) present in the recipe contain above fat blend 4 as well the milk fat present in the milk powder, the hazelnut oil present in the hazelnut paste and the cocoa butter present in the cocoa powder and they have characteristics as shown in table 7, below.

Preparation of the Chocolate Hazelnut Spread 4 According to the General Procedure of Deep Cooling:

The different ingredients as listed in table 4, above were mixed. The mixture obtained was brought into a metal bowl and subjected to cooling in a water bath at 12° C. under continuous stirring and scraping until the mixture started to thicken and started to build structure thereby forming the spread.

In this example 4, at different depositing temperatures (18.1° C., 17.2° C. and 16.1° C.), samples of the spread was deposited as 200 g portions and left at 20° C. prior to evaluation, see experimental results in table 5 below.

Spread 4: For the preparation of spread 4, the mixture had to be cooled to a temperature of 16.1° C. Then it started to thicken, i.e. when the mass was stirred, it flew less easily and patterns drawn with the mixing equipment into the mass did not disappear but remained clearly visible on the surface. The cooling was stopped and the spread obtained was also kept at 20° C.

Texture and visual appearance of the spread samples at different depositing temperatures (18.1, 17.2 and 16.1° C.) were evaluated after 1 week; the hardness (T) was measured with a 10 mm pin probe to a depth of 10 mm at a speed of 0.5 mm/sec and at 20° C.

TABLE 5

| T depositing (° C.) | Hardness (T) expressed in gram | Visual appearance |
|---|---|---|
| 18.1 | 38 | Small crystals visible |
| 17.2 | 62 | Small crystals visible |
| 16.1 | 314 | Nice uniform surface |

Table 5 clearly demonstrates that cooling to 16.1° C. resulted in the spread 4 which shows quick stabilisation, has a firm texture and a very good appearance.

Moreover, it remains stable over time, as shown in the table 6 below:

TABLE 6

| Spread 4 age | Hardness (T) expressed in gram | Visual appearance |
| --- | --- | --- |
| 1 day | 301 | Nice uniform surface, no oiling out, no recrystallisation |
| 1 week | 314 | |
| 1 month | 377 | |
| 4 months | 391 | |

An alternative method for preparing the spread 4 was tested by applying a chocolate tempering machine. In chocolate processing this is a well known method to stabilize a product and also in EP 2 007 214 this method proofed to be very appropriate. The chocolate hazelnut spread 4 was cooled with a lab tempering machine AMK-50 (Aasted), once to 30° C. and once to 25.5° C. However, already after 1 day, clear signs of graininess could be seen for samples taken at both depositing temperatures. Moreover, the chocolate hazelnut spreads remained pourable and were not suitable for application as a spread.

The chocolate hazelnut spread 4 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 7. In this context, SFCnn represents the SFC at nn° C. in weight percent, the SFC being measured according to IUPAC method 2.150 a.

TABLE 7

| | Spread 4 |
| --- | --- |
| Total Fat Content (i.e. the composition ($G_F$), wt %) | 31.1 |
| Fat characteristics (wt %) | |
| Hydrogenated fat components | no |
| Diglyceride components (wt %) | 3.4 |
| Nut paste | yes |
| Fatty acid residue concentrations (wt %)-triglycerides | |
| C12:0 | 0.10 |
| (C14:0 + C16:0)/C18:0 | 0.76 |
| SAFA | 14.2 |
| TFA | <0.1 |
| SUS/SSU | >1 |
| SFC profile and hardness | |
| SFC20 | 0.99 |
| SFC25 | 0.00 |
| SFC35 | 0.00 |
| hardness (T)$^a$ | 314 |
| R = T/SFC20 | 317 |

$^a$T is the hardness of the food product expressed in gram. The hardness (T) of the spread 4 was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

Spread 4 is an edible product according to the invention. It is again surprising that the spread 4, which contains a very high percentage of liquid oil, coming from the sunflower oil and the hazelnut oil in the hazelnut paste, and which contains hardly any solid fat at 20° C. as can be seen from the SFC20 being only 0.99%, can obtain a very nice and stable texture, without any signs of recrystallization or oiling out, even when stored for several months. In this example 4, the required ratio R=T/SFC20 being at least 125, i.e. 317 was fulfilled which was obtained here by processing according to the deep cooling method. In terms of fat characteristics (SAFA, SFC20, SFC35 etc.), this spread 4 is quite similar to the market sample Comp Sample 4, but this market sample shows a very strong tendency to oiling out.

The fat blend 4 consisting of 11.5% shea stearine and 88.5% of high oleic sunflower oil, contained 3.4 ppm Mineral Oil Saturated Hydrocarbons with a chain length>C24 and = or <C35 and less than 1 ppm Mineral Oil Aromatic Hydrocarbons with the same chain length. The analysis was performed with LC-GC-FID conform the Bfr method (2012), currently in use.

Example 5

In this example 5, different fat blends, as detailed below, are tested also containing cocoa butter or fractions thereof, as a hard fat component.

Fat blend 5.1 was prepared by blending 11.5% of molten cocoa butter and 88.5 of High Oleic Sunflower Oil (HO SFO).

Fat blend 5.2 was prepared by blending 11.5% of molten cocoa butter stearine and 88.5 of High Oleic Sunflower Oil (HO SFO).

Fat blend 5.3 was prepared by blending 5.75% of molten shea stearine, 5.75% of molten cocoa butter and 88.5 of High Oleic Sunflower Oil (HO SFO).

Chocolate hazelnut spreads 5.1, 5.2 and 5.3 were prepared using Fat blends 5.1, 5.2 and 5.3, respectively, thereby applying the recipe 2, as detailed above in table 4.

Preparation of the Chocolate Hazelnut Spreads 5.1, 5.2 and 5.3 According to the General Procedure of Deep Cooling:

The different ingredients as listed in table 4, above were mixed. The mixture obtained was brought into a metal bowl and subjected to cooling in a water bath at 12° C. under continuous stirring and scraping until the mixture started to thicken and started to build structure thereby forming the spread.

Each of these spreads 5.1, 5.2 and 5.3 were cooled to a temperature at which an increase in texture could be seen, as described more thoroughly in Example 4. These cooling temperatures are indicated in table 8, below:

TABLE 8

| Spreads | T depositing (° C.) | Hardness (T) expressed in gram |
| --- | --- | --- |
| Spread 5.1 | 13.9 | 73 |
| Spread 5.2 | 15.4 | 201 |
| Spread 5.3 | 14.9 | 219 |

All spreads had a very nice, shiny appearance with no signs of recrystallization on the surface.

Each of these spreads 5.1, 5.2 and 5.3 were analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 9. In this context, SFCnn represents the SFC at nn° C. in weight percent, the SFC being measured according to IUPAC method 2.150 a.

TABLE 9

|  | Spread 5.1 | Spread 5.2 | Spread 5.3 |
|---|---|---|---|
| Total Fat Content (i.e. the composition ($G_F$), wt %) | 31.1 | 31.1 | 31.1 |
| Fat characteristics (wt %) |  |  |  |
| Hydrogenated fat components | no | no | no |
| Diglyceride components (wt %) | 2.8 | 2.4 | 2.8 |
| Nut paste | yes | yes | yes |
| Fatty acid residue concentrations (wt %) - triglycerides |  |  |  |
| C12:0 | 0.10 | 0.09 | 0.10 |
| (C14:0 + C16:0)/C18:0 | 1.21 | 1.10 | 0.96 |
| SAFA | 14.1 | 14.2 | 14.1 |
| TFA | <0.1 | <0.1 | <0.1 |
| SUS/SSU | >1 | >1 | >1 |
| SFC profile and hardness |  |  |  |
| SFC20 | 0.01 | 0.01 | 0.09 |
| SFC25 | 0.00 | 0.00 | 0.00 |
| SFC35 | 0.00 | 0.00 | 0.00 |
| hardness (T)[a] | 89 | 201 | 214 |
| R = T/SFC20 | 8900 | 20100 | 2378 |

[a]T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

Each of these spreads 5.1, 5.2 and 5.3 had a nice, spreadable and stable texture, although hardly any solid fat content was present at room temperature, as can be seen from their SFC20 values.

A blind taste session was organized with chocolate hazelnut spread 5.3 of example 5 and chocolate hazelnut spread 4 of example 4, which were both stabilized for at least 1 week.

8 panelists were asked to assess the two chocolate hazelnut spreads for 3 main attributes: visual appearance, spreadability onto bread and taste.

|  | Spread 5.3 | Spread 4 |
|---|---|---|
| Visual appearance |  |  |
| Gloss | +++ | ++ |
| Graininess | No | No |
| Spreadability |  |  |
| Spreading on bread | ++++ | +++ |
| Taste |  |  |
| Melting in the mouth | ++++ | +++ |

Overall the spread 5.3, containing cocoa butter as fat ingredient got the best score.

Example 6

In this example 6, the stability of the chocolate hazelnut spread 4 is demonstrated

Example 6A

The chocolate hazelnut spread 4 was stabilized for 1 week at 20° C. After this period, samples were put for 3 days at 25° C. to assess heat stability of chocolate hazelnut spread 4. After this temperature treatment, the samples were put back at 20° C. and left overnight. The next day, samples were evaluated; the results are given in the table 10 below:

TABLE 10

| Sample description | Hardness (T) expressed in gram | Visual appearance |
|---|---|---|
| Left at 20° C. for entire period | 314 | No oiling out, no recrystallisation |
| Overnight at 25° C. → measured at 25° C. | 38 | No oiling out, no recrystallisation |
| 3 days at 25° C. → overnight at 20° C. | 339 | No oiling out, no recrystallisation |
| 3 days at 25° C. → 3 months at 20° C. | 323 | No oiling out, no recrystallisation |

After 3 months the sample that was subjected to this heat treatment was evaluated once more. The visual appearance was perfect and the texture was unchanged.

Example 6B

The chocolate hazelnut spread 4 was put at 25° C. for either 1 hour or 1 day, immediately after depositing. Then, samples were put at 20° C. for at least 4 hours prior to texture measurements. The table 11 below shows the obtained results:

TABLE 11

| Sample description | Hardness (T) expressed in gram | Visual appearance |
|---|---|---|
| Left at 20° C. for entire period | 324 | No oiling out, no recrystallisation |
| 1 hour at 25° C. → back at 20° C. | 324 | No oiling out, no recrystallisation |
| 1 day at 25° C. → back at 20° C. | 353 | No oiling out, no recrystallisation |

It is surprising to see that after a heat treatment at 25° C. for several hours to several days, the sample still has sufficient texture at this temperature and returns to it's initial texture and appearance once it is brought back at 20° C., despite the fact that the fat phase contains such a high amount of liquid oil and SFC at 25° C. is 0 for these blends. No signs of oiling out nor recrystallization could be seen on the surface.

Example 6C

The chocolate hazelnut spread 4 was stabilized for 1 week at 20° C. Then, samples were put for 3 days at 28° C. to assess heat stability of chocolate hazelnut spread 4. After this temperature treatment, the samples were put back at 20° C. and left overnight. The next day, samples were evaluated, the results are given in the table 12 below:

TABLE 12

| Sample description | Hardness (T) expressed in gram | Visual appearance |
|---|---|---|
| Left at 20° C. for entire period | 314 | No oiling out, no recrystallisation |
| Overnight at 28° C. → measured at 28° C. | 12 | No oiling out, no recrystallisation |
| 3 days at 28° C. → overnight at 20° C. | 354 | No oiling out, no recrystallisation |
| 3 days at 28° C. → 3 months at 20° C. | 333 | No oiling out, no recrystallisation |

Even after a heat treatment of 3 days at 28° C., surprisingly enough The chocolate hazelnut spread 4 turns back to a spread with a nice, shiny appearance and a good consistency, comparable to a sample left at 20° C. without any heat treatment. It does not show signs of recrystallization nor oiling out. Also after 3 months the sample subjected to this heat treatment doesn't show any change in appearance or texture. Contrary to the prior art, where for chocolate spreads, with or without nuts, with reduced SAFA-content, use is made of high melting fractions, like for instance palm stearin, to obtain heat stability, the fat in the chocolate hazelnut spread 4 does not contain such fat component, as can be seen from its solid fat content, which at 25° C. is already 0% (Table 7). Nevertheless spread 4 shows perfect heat stability at 25° C. and even at 28° C.

Example 6D

The chocolate hazelnut spread 4 was stabilized for 1 week at 20° C., then samples were put at 15° C. and at 10° C. After 1 day at these temperatures, textures were measured and compared with a reference market sample based on palmoil. Results are summarized in table 13, herein below:

TABLE 13

| Temperature | Spread 4 Hardness (T) expressed in gram | Comparative market sample Hardness (T) expressed in gram |
| --- | --- | --- |
| 20° C. | 345 | 33 |
| 15° C. | 601 | 506 |
| 10° C. | 838 | 2057 |

Compared to the comparative market sample, the texture of spread 4 is harder at 20° C. and 15° C. However, at 10° C., which is close to standard refrigerator temperatures, spread 4 remains softer and better spreadable than the market sample. The texture of the comparative market sample was much more temperature dependent than spread 4. The spread 4 stored at 10° C. for 1 day, was then stored for 1 week at 20° C. The texture was measured and gave as result a hardness (T) expressed in gram of 381 g. This proofs that the spread 4 stored at refrigerator temperature and then brought back to room temperature, also gets back its normal texture at room temperature.

Example 7

In this example 7, a fat blend 7 was prepared by blending 11.5% of molten shea stearin and 88.5% of standard sunflower oil.

A Chocolate hazelnut spread 7 was prepared using Fat blend 7, thereby applying the recipe 2, as detailed above in table 4.

Preparation of the Chocolate Hazelnut Spread 7 According to the General Procedure of Deep Cooling:

The different ingredients as listed in table 4, above were mixed. The mixture obtained was brought into a metal bowl and subjected to cooling in a water bath at 12° C. under continuous stirring and scraping until the mixture started to thicken and started to build structure thereby forming the spread. At a temperature of 15.9° C., the spread 7 became thick as described in the examples above. It was deposited in 200 g portions, which were kept at 20° C. Within 1 day, a texture of 346 g (measured with 10 mm pin probe, depth 10 mm, 0.5 mm/sec) was measured and the spread 7 showed excellent gloss and appearance.

Spread 7 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 14. In this context, SFCnn represents the SFC at nn° C. in weight percent, the SFC being measured according to IUPAC method 2.150 a.

TABLE 14

|  | Spread 7 |
| --- | --- |
| Total Fat Content (i.e. the composition ($G_F$), wt %) | 31.1 |
| Fat characteristics (wt %) |  |
| Hydrogenated fat components | no |
| Diglyceride components (wt %) | 1.9 |
| Nut paste | yes |
| Fatty acid residue concentrations (wt %) - triglycerides |  |
| C12:0 | 0.0 |
| (C14:0 + C16:0)/C18:0 | 0.84 |
| SAFA | 15.3 |
| TFA | <1 |
| SUS/SSU | >1 |
| SFC profile and hardness |  |
| SFC20 | 2.13 |
| SFC25 | 0.24 |
| SFC35 | 0.00 |
| hardness (T)$^a$ | 348 |
| R = T/SFC20 | 166 |

$^a$T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

The advantage of the spread 7 prepared in this example 7 is its high PUFA-content (60.0% on the added fat to the recipe).

Example 8

Fat blend 8 was prepared by blending 3.2% of molten shea stearin and 96.8% High Oleic Sunflower Oil (HO SFO).

A chocolate spread 8 was prepared using Fat blend 8, thereby applying the following recipe 3, as shown in table 15. Milk chocolate with a fat content of 40% was added to this recipe, in order to give it a typical milk chocolate taste.

TABLE 15

| Sugar | 42.9% |
| --- | --- |
| Fat blend 4 | 31.8% |
| Milk chocolate | 9.0% |
| Cocoa powder, defatted | 8.2% |
| Skimmed milk powder | 3.5% |
| Whey powder | 4.6% |
| Lecithin | 0.4% |
| Vanillin | 0.002% |

Preparation of the Chocolate Spread 8 According to the General Procedure of Deep Cooling:

The different ingredients as listed in table 15, above were mixed at 45° C. The mixture obtained was brought into a metal bowl and was cooled to 15° C. by continuous stirring in a water bath at 12° C. thereby forming the spread 8.

The obtained spread 8 did not show any signs of recrystallisation nor graininess; it had a very nice, shiny appearance and a texture suitable for spreading. The sample was evaluated by a taste panel and was found to have a very nice melting in the mouth combined with a very good taste.

Spread 8 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 16. In this context, SFCnn represents the SFC at nn° C. in weight percent, the SFC being measured according to IUPAC method 2.150 a.

TABLE 16

|  | Spread 8 |
| --- | --- |
| Total Fat Content (i.e. the composition ($G_F$), wt %) | 36.2 |
| Fat characteristics (wt %) |  |
| Hydrogenated fat components | no |
| Diglyceride components (wt %) | 2.47 |
| Nut paste | no |
| Fatty acid residue concentrations (wt %) - triglycerides |  |
| C12:0 | 0.19 |
| (C14:0 + C16:0)/C18:0 | 0.81 |
| SAFA | 17.8 |
| TFA | <1 |
| SUS/SSU | >1 |
| SFC profile and hardness |  |
| SFC20 | 0.63 |
| SFC25 | 0.08 |
| SFC35 | 0.00 |
| hardness (T)$^a$ | 102 |
| R = T/SFC20 | 162 |

$^a$T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

Example 9

In this example 9, a fat blend 9 was prepared by blending 30% of molten shea butter and 70% of High Oleic Sunflower Oil.

A Chocolate hazelnut spread 9 was prepared using Fat blend 9, thereby applying the recipe 2, as detailed above in table 4.

Preparation of the Chocolate Hazelnut Spread 9 According to the General Procedure of Deep Cooling:

The different ingredients as listed in table 4, above were mixed. The mixture obtained was brought into a metal bowl and subjected to cooling in a water bath at 12° C. under continuous stirring and scraping until the mixture started to thicken and started to build structure thereby forming the spread. At a temperature of 16° C., the spread 9 became thick as described in the examples above. The cooling and stirring was stopped at a temperature of 15.8° C. and the spread 9 was stored at 20° C. Already within 1 day, a texture of 367 g (measured with at 10 mm pin probe to a depth of 10 mm at 0.5 mm/sec) was measured. The hazelnut spread 9 had a very glossy, shiny and firm appearance.

Spread 9 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 17. In this context, SFCnn represents the SFC at nn° C. in weight percent, the SFC being measured according to IUPAC method 2.150 a.

TABLE 17

|  | Spread 9 |
| --- | --- |
| Total Fat Content (i.e. the composition ($G_F$), wt %) | 31.1 |
| Fat characteristics (wt %) |  |
| Hydrogenated fat components | no |
| Diglyceride components (wt %) | 4.0 |
| Nut paste | yes |
| Fatty acid residue concentrations (wt %) - triglycerides |  |
| C12:0 | 0.08 |
| (C14:0 + C16:0)/C18:0 | 0.54 |
| SAFA | 17.3 |
| TFA | <1 |
| SUS/SSU | >1 |
| SFC profile and hardness |  |
| SFC20 | 1.08 |
| SFC25 | 0.14 |
| SFC35 | 0.00 |
| hardness (T)$^a$ | 402 |
| R = T/SFC20 | 365 |

$^a$T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

The advantage of spread 9 versus previous spread 4 is that it applies non fractionated shea butter, which is cheaper than shea stearin. The structure of the obtained spread 9 is quite comparable, but the SAFA-content is higher (17.3% vs 14.2% in spread 4).

To monitor in more detail the process of building structure of the spread during cooling and stirring, the preparation process of the spread 9 was repeated and samples were taken to assess structure and changes in structure during the cooling process. The texture was too soft to measure with the 10 mm pin probe, therefore another method was applied, which is known as a spreadability measurement. For this test the same Texture Analyzer from Stable Micro Systems is used, but now equipped with a TTC Spreadability Fixture type HDP/SR. The TTC Spreadability Fixture is a set of precisely matched male and female perspex 90° cones. The material to be measured is brought into the female cone by means of a spatula. Care is taken to keep deformation during sample preparation to a minimum. The female cone is placed in the sample holder. Measurement is always started from above the product surface till 2 mm above the lowest surface. During measurement, the sample is squeezed out with a probe speed of 0.3 mm/sec. The peak force is the maximum force to shear. Following values for spreadability were measured during cooling of the spread 9

|  | Temperature (° C.) | | | | | | | |
| --- | --- | --- | --- | --- | --- | --- | --- | --- |
|  | 45.0 | 33.6 | 25.0 | 20.6 | 18.9 | 18.1 | 17.1 | 16.1 |
| Spreadability (g) | 582 | 653 | 771 | 851 | 901 | 913 | 943 | 1873 |

As can be seen, at a temperature between 17.1 and 16.1° C. a sharp increase is observed in spreadability value. This corresponds to the strong increase in thickness that was observed during preparation of the spread. When the product goes through this phase, a stable final product can be obtained, as described in example 4.

Example 10

In this example 10, a fat blend 10 was prepared by blending 11.5% of molten sal stearin and 88.5% of High Oleic Sunflower Oil (HO SFO).

A Chocolate hazelnut spread 10 was prepared using Fat blend 10, thereby applying the recipe 2, as detailed above in table 4.

Preparation of the Hazelnut Spread 10 According to the General Procedure of Deep Cooling:

The different ingredients as listed in table 4, above were mixed. The mixture obtained was brought into a metal bowl and subjected to cooling in a water bath at 10° C. under continuous stirring and scraping until the mixture started to thicken and started to build structure thereby forming the spread. There was a significant increase in firmness when the temperature was at 12.6° C. Texture was measured after 1 week (measured with at 10 mm pin probe to a depth of 10 mm at 0.5 mm/sec) and found to be 137 g. The hazelnut spread 10 had a very shiny and firm appearance.

Spread 10 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 18. In this context, SFCnn represents the SFC at nn° C. in weight percent, the SFC being measured according to IUPAC method 2.150 a.

TABLE 18

|  | Spread 10 |
|---|---|
| Total Fat Content (i.e. the composition ($G_F$), wt %) | 31.1 |
| Fat characteristics (wt %) |  |
| Hydrogenated fat components | no |
| Diglyceride components (wt %) | 3.2 |
| Nut paste | yes |
| Fatty acid residue concentrations (wt %) - triglycerides |  |
| C12:0 | 0.10 |
| (C14:0 + C16:0)/C18:0 | 0.81 |
| SAFA | 14.3 |
| TFA | <1 |
| SUS/SSU | >1 |
| SFC profile and hardness |  |
| SFC20 | 0.01 |
| SFC25 | 0.00 |
| SFC35 | 0.00 |
| hardness (T)$^a$ | 137 |
| R = T/SFC20 | 13700 |

$^a$T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

Example 11

Fat blend 11 was prepared by blending 11.5% of molten shea stearin and 88.5% high oleic rapeseed oil.

A hazelnut spread 11 (particle size 30 μm) was prepared using Fat blend 11, thereby applying the following recipe 4, as shown in table 19.

TABLE 19

| Sugar | 44.6% |
|---|---|
| Fat blend 4 | 23.7% |
| Milk chocolate | 9.0% |
| Hazelnut paste | 14.4% |
| Cocoa mass | 4.8% |
| Cocoa powder, defatted | 3.8% |
| Skimmed milk powder | 4.8% |
| Whey powder | 3.8% |
| Lecithin | 0.4% |
| Vanillin | 0.05% |

Preparation of the Spread 11 According to the General Procedure of Deep Cooling:

The different ingredients as listed in table 19, above were mixed. The mixture obtained was brought into a metal bowl and was cooled by continuous stirring in a water bath at 10° C. thereby forming the spread 11.

Spread 11: For the preparation of spread 11, the mixture had to be cooled to a temperature of 16.5° C. at which the product started to become thick and more difficult to stir. The spread 11 had a very nice, shiny surface and a good texture.

Spread 11 was analysed and the fat characteristics, the fatty acid residue concentrations, some of the solid fat content (SFC) characteristics, the hardness (T) at 20° C., the ratio (R) between the hardness (T) and the SFC at 20° C. (R=T/SFC20) are given in table 20. In this context, SFCnn represents the SFC at nn° C. in weight percent, the SFC being measured according to IUPAC method 2.150 a.

TABLE 20

|  | Spread 10 |
|---|---|
| Total Fat Content (i.e. the composition ($G_F$), wt %) | 36.0 |
| Fat characteristics (wt %) |  |
| Hydrogenated fat components | no |
| Diglyceride components (wt %) | 2.78 |
| Nut paste | yes |
| Fatty acid residue concentrations (wt %) - triglycerides |  |
| C12:0 | 0.01 |
| (C14:0 + C16:0)/C18:0 | 0.74 |
| SAFA | 15.5 |
| TFA | <1 |
| SUS/SSU | >1 |
| SFC profile and hardness |  |
| SFC20 | 2.93 |
| SFC25 | 0.00 |
| SFC35 | 0.00 |
| hardness (T)$^a$ | 463 |
| R = T/SFC20 | 158 |

$^a$T is the hardness of the food product expressed in gram. The hardness (T) of all the spreads was measured after 1 week with an SMS-texture meter type TA.XT plus at 20° C. using a hard plastic cylindrical probe of a diameter of 10 mm, to a penetration depth of 10 mm at a probe speed of 0.5 mm/sec.

Example 12

In this example 12, a fat blend 12 having a SAFA-content of 14.9% was prepared by blending a hard shea fraction with High Oleic Sunflower Oil.

A Chocolate hazelnut spread 12 was prepared using Fat blend 12 thereby applying the recipe 2, as detailed above in table 4.

The fat blend 12 was molten and blended with the other ingredients and the obtained mass was then cooled to 25° C. thereby forming an unstabilized spread 12.1.

A similar spread was prepared and stabilized according to the preparation method described in example 4, thereby forming a stabilized spread 12.2. Said spread 12.2 was kept for 1 month at 20° C.; it had a texture of 447 g at 20° C. This spread 12.2 was then stored overnight at 25° C. and it was added to spread 12.1 at 25° C. in following concentrations, thereby forming spread 12.3 and spread 12.4, respectively:

Spread 12.1—0% stabilized spread 12.2 added
Spread 12.3—5% stabilized spread 12.2 added
Spread 12.4—10% stabilized spread 12.2 added Both spreads 12.1 and 12.2 were mixed well, deposited in 200 g portions and stored for 1 week at 20° C. Texture was measured with a 10 mm pin probe to a depth of 10 mm with a speed of 0.5 mm/sec. The results are given in the table 21 below.

TABLE 21

| Spread | Hardness (T) expressed in gram | Visual appearance |
|---|---|---|
| Spread 12.1 | 55 | Tendency to oil out; marbled surface |
| Spread 12.3 | 425 | Shiny surface, no signs of recrystallisation nor oiling out |
| Spread 12.4 | 419 | Shiny surface, no signs of recrystallisation nor oiling out |

The texture of spreads 12.3 and 12.4 is quite similar to the 1 month old spread 4 (table 6) prepared according to the method described in example 4.

The advantage of the preparation method described in this example 12 is that it does not require special equipment to cool down the product to very low temperatures, where it starts to thicken and crystallize. Another advantage is that a stabilized product is obtained at a temperature of 25° C., a temperature at which the product has a quite low viscosity and is easy to pump and to deposit.

Example 13

In the current example 13, the same method of stabilizing a spread is applied as in example 12, with this difference that not a 1 month old spread is used to stabilize a non-stabilized product, but that now freshly prepared stabilized spreads are used.

The same spread as in example 12 was prepared according to the method of Example 4. Therefore it was cooled to 15.9° C. Samples were deposited in 200 g portions and stored at 25° C.

Within 20 minutes, this stabilized spread 13.2, freshly prepared, was added to a non-stabilized spread 13.1 which was cooled to 25° C., in a concentration of 5%. The spreads 13.1 and 13.2 were mixed well, thereby forming spread 13.3 and deposited as 200 g portions. Samples of spread 13.3 were stored at 20° C. Samples of spread 13.3 was then stored for 1 week at 20° C. The texture was measured according to the method described in previous examples. Following results were obtained:

| Spread | Hardness (T) expressed in gram |
|---|---|
| Spread 13.3 | 454 |

As can be seen the texture obtained with addition of a freshly stabilized spread is very similar to the one obtained by using a 1 month old sample (447 g) (cf example 12).

The invention claimed is:

1. An edible product suitable for use as spreads comprising, based on the total weight of the edible product,
   a) from 15 to 80 percentage by weight (wt %) of a glyceride composition [composition ($G_F$)],
   b) from 20 to 85 wt % of a fat-free part comprised in at least one filler material, and
   c) at most 20 wt % of water,
   wherein the composition ($G_F$) comprises, with respect to the total weight of the composition ($G_F$):
   d) from 5 to 20 wt % of saturated fatty acid residues (SAFA),
   e) at most 3 wt % of trans unsaturated fatty acid residues (TFA),
   f) at most 8 wt % of C12:0 fatty acid residues,
   g) C14:0, C16:0 and C18:0 fatty acid residues wherein the weight ratio of (C14:0+C16:0) to C18:0 is at most 1.0,
   h) SUS-triglycerides [SUS] and SSU-triglycerides [SSU] wherein the weight ratio of the SUS to the SSU is more than 1.0, wherein S represents a saturated fatty acid residue having from 16 to 18 carbon atoms and U represents an unsaturated fatty acid residue having 18 or more carbon atoms,
   and wherein the composition ($G_F$) has
   i) a solid fat content (SFC) at 20° C. of less than 5 wt % and an SFC at 35° C. of less than 1 wt % wherein the SFC is measured according to International Union of Pure and Applied Chemistry (IUPAC) method 2.150 a,
   and wherein the edible product has
   j) a hardness (T) of maximum 1000 g and a ratio (R) between the hardness (T) and the SFC at 20° C., R=T/SFC20% of at least 125, whereby T is the hardness of the food product expressed in gram and measured with an SMS-texture meter type TA.XT plus at 20° C. using a metal or hard plastic cylindrical probe of a diameter of 10 mm, to a penetration depth of 10 mm at a probe speed of 0.5 mm/sec.

2. The edible product according to claim 1, wherein the edible product comprises water in an amount of at most 15 wt %, based on the total weight of the edible product.

3. The edible product according to claim 1, wherein the edible product comprises the fat-free part comprised in the at least one filler material in an amount from 25 to 80 wt %, based on the total weight of the edible product.

4. The edible product according to claim 1, wherein the at least one filler material comprises at least one component selected from the group consisting of sugar, maltodextrin, inulin, stevia, sucralose, flour, starch, skimmed milk powder, whole milk powder, whey powder, lactose, cocoa powder, coffee powder, food grade inorganic solid powders, and a blend thereof.

5. The edible product according to claim 1, wherein the at least one filler material comprises a fat-free part of a component selected from the group consisting of nut paste, cocoa mass, and oilseed paste.

6. The edible product according to claim 1, wherein the composition ($G_F$) comprises diglycerides in an amount of at most 5 wt %, based on the total weight of the composition ($G_F$).

7. The edible product according to claim 1, wherein the TFA content in the composition ($G_F$) is at most 2 wt %, relative to the total weight of the composition ($G_F$).

8. The edible product according to claim 1, wherein the composition ($G_F$) is further characterized by at least one of the following features, relative to the total weight of the composition ($G_F$):
   f) at most 5 wt % of the C12:0 fatty acid residues,
   g) is the weight ratio of (C14:0+C16:0) to C18:0 is at most 0.75,
   h) the weight ratio of the SUS to the SSU is at least 1.5,
   and wherein the composition ($G_F$) has
   i) the SFC at 20° C. is less than 4 wt %, and the SFC at 35° C. is less than 0.8 wt %.

9. The edible product according to claim 1, wherein the edible product is characterized by a ratio R=T/SFC20% of at least 150.

10. The edible product according to claim 1, wherein the edible product has a hardness (T) of maximum 800 g.

11. The edible product according to claim 1, wherein the edible product is characterized by a ratio T20-25-20/T20 of between 0.7 and 1.3, wherein T20 is the hardness of the edible product which has been stored during 1 week at 20° C., and T20-25-20 is the hardness of the edible product which has been first stored for 1 week at 20° C., followed by storage for 3 days at 25° C., and followed by storage at 20° C. for 1 day.

12. The edible product according to claim 1, wherein the edible product is not an emulsion.

13. The edible product according to claim 1, wherein the composition ($G_F$) comprises at least one hard or semi hard fat component and at least one liquid oil component and wherein the amount of the hard or semi-hard fat component is present in the range from 5 to 30 wt %, and the amount of the at least one liquid oil component is present in the range from 70 to 95 wt %, and both ranges are based on the weight of the composition ($G_F$).

14. The edible product according to claim 13, wherein the liquid oil chosen as the liquid oil component is a vegetable oil selected from the group of rapeseed oil, corn oil, soy oil, sunflower seed oil, cotton seed oil, olive oil, hazelnut oil, groundnut oil, liquid fractions of palm oil, liquid fractions of shea butter, and a blend thereof.

15. The edible product according to claim 13, wherein the hard or semi-hard fat chosen as the hard or semi-hard fat component or as part of the hard or semi-hard fat component is a fat which comprises at least 50 wt % of S2U-triglycerides [S2U], based on the weight of the hard or semi-hard fat component and wherein the weight ratio of the S2U to S3 content in the hard or semi-hard fat component is at least 10, and wherein S represents a saturated fatty acid residue having 16 to 18 carbon atoms and U represents an unsaturated fatty acid residue having 18 or more carbon atoms.

16. The edible product according to claim 13, wherein in the hard or semi-hard fat component, the weight ratio of SUS triglyceride to SSU triglyceride is more than 1.

17. A food product comprising the edible product according to claim 1.

18. The food product according to claim 17, wherein the food product is selected from the group consisting of a filled chocolate product, baked products with a filling, a biscuit having a cream layer sandwiched between two biscuits, a biscuit having a cream layer sandwiched between more than two biscuits, a filled confectionery product, a topped confectionery product, a filled culinary product, a topped culinary product, and a frozen edible product covered with a coating.

19. A process for producing the edible product according to claim 1, comprising the steps of blending, based on the total weight of the edible product,
a) from 15 to 80 wt % of the composition ($G_F$), as defined according to claim 1, wherein said composition ($G_F$) is in an at least partly molten form,
b) from 20 to 85 wt % of the fat-free part of the at least one filler material, as defined according to claim 1, and
c) at most 20 wt % of water.

20. The process according to claim 19, wherein the process comprises the step of mixing of:
(i) an added fat composition (A) being in an at least partly molten form,
(ii) the at least one filler material containing a fat part and a fat-free part,
(iii) optionally water, and
(iv) optionally at least one additive,
wherein the glyceride composition (G) comprises the added fat composition (A) and the fat part of the at least one filler material,
thereby obtaining a mixture.

21. The process according to claim 20, wherein during said step of mixing or after the formation of the mixture, the process further comprises at least a step of cooling and agitation, to at least a temperature at which the spreadability value of said mixture starts increasing by at least 25% over a temperature range of 1° C., wherein the spreadability value is the peak force or the maximum force to shear, as measured with a Texture Analyzer from Stable Micro Systems, equipped with a TTC Spreadability test Fixture type HDP/SR.

* * * * *